(12) United States Patent
Tuken

(10) Patent No.: US 10,190,470 B2
(45) Date of Patent: Jan. 29, 2019

(54) CATALYTIC DEVICE DETECTION SYSTEM

(71) Applicant: Deere & Company, Moline, IL (US)

(72) Inventor: Taner Tuken, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 88 days.

(21) Appl. No.: 14/739,275

(22) Filed: Jun. 15, 2015

(65) Prior Publication Data

US 2016/0363032 A1 Dec. 15, 2016

(51) Int. Cl.
| *F01N 11/00* | (2006.01) |
| *G01M 15/10* | (2006.01) |
| *G01M 15/04* | (2006.01) |

(52) U.S. Cl.
CPC .......... *F01N 11/005* (2013.01); *F01N 11/002* (2013.01); *F01N 2550/24* (2013.01); *G01M 15/042* (2013.01); *G01M 15/102* (2013.01); *Y02T 10/47* (2013.01)

(58) Field of Classification Search
CPC ...... G01M 15/102; G01M 15/042; F01N 1/00
USPC ......... 73/114.01, 114.69; 374/144; 701/30.2, 701/107
See application file for complete search history.

(56) References Cited

U.S. PATENT DOCUMENTS

| 6,240,343 | B1 * | 5/2001 | Sarangapani | ....... F02D 41/1405 |
| | | | | 701/101 |
| 7,152,392 | B2 | 12/2006 | Kuboshima et al. | |
| 8,387,365 | B2 * | 3/2013 | Thouvenel | .............. F01N 9/005 |
| | | | | 60/277 |
| 8,397,500 | B2 * | 3/2013 | Andrasko | .............. F02D 23/00 |
| | | | | 60/605.1 |
| 2002/0000087 | A1 * | 1/2002 | Baeuerle | ............... F01N 3/2006 |
| | | | | 60/274 |
| 2004/0112044 | A1 * | 6/2004 | Plote | ..................... F01N 11/002 |
| | | | | 60/277 |
| 2005/0102076 | A1 * | 5/2005 | Kariya | .................. F02D 41/222 |
| | | | | 701/30.2 |

(Continued)

FOREIGN PATENT DOCUMENTS

DE 102009003091 A1 11/2010

OTHER PUBLICATIONS

European Search Report in foreign counterpart application No. EP 16174006.3, dated Oct. 24, 2016 (6 pages).

*Primary Examiner* — Randy Gibson
*Assistant Examiner* — Gedeon M Kidanu

(57) ABSTRACT

An engine includes an exhaust gas system which flows exhaust gasses through an aftertreatment device. A method is provided for detecting the aftertreatment device during a transient operating condition. The method includes sensing temperature of the exhaust gas at an inlet and at an outlet of exhaust aftertreatment system. The inlet temperature is filtered and an inlet temperature difference between the filtered and unfiltered inlet temperatures is calculated. If the absolute value of the inlet temperature difference is greater than the predetermined threshold, then an outlet temperature difference is calculated. If the absolute value of the outlet temperature difference is greater than the second threshold, then a fault signal is generated, indicating that an aftertreatment device is missing. The aftertreatment device includes an SCR catalyst and an ammonia oxidation catalyst.

12 Claims, 2 Drawing Sheets

(56) References Cited

U.S. PATENT DOCUMENTS

| | | | |
|---|---|---|---|
| 2006/0080959 A1* | 4/2006 | Ruiz | F02B 37/12 60/603 |
| 2006/0089783 A1* | 4/2006 | Braun | F01N 11/002 701/114 |
| 2009/0210129 A1* | 8/2009 | Leprieur | F01N 11/002 701/102 |
| 2009/0229252 A1* | 9/2009 | Thouvenel | F01N 3/023 60/277 |
| 2010/0083730 A1* | 4/2010 | Le | G01K 3/005 73/1.02 |
| 2010/0162691 A1* | 7/2010 | Holmen | F01N 11/002 60/299 |
| 2011/0000193 A1 | 1/2011 | Paterson et al. | |
| 2011/0143449 A1 | 6/2011 | Lana et al. | |
| 2013/0133399 A1* | 5/2013 | Hibino | F02D 41/1494 73/23.31 |
| 2015/0040539 A1* | 2/2015 | Tylutki | F01N 3/0256 60/274 |
| 2015/0043611 A1* | 2/2015 | Li | F01N 11/002 374/104 |
| 2015/0224447 A1* | 8/2015 | Nishizawa | F01N 13/009 423/212 |

* cited by examiner

CATALYTIC DEVICE DETECTION SYSTEM

FIELD OF THE INVENTION

The present disclosure relates to a system which detects presence and absence of a catalytic device used on Diesel engines.

BACKGROUND OF THE INVENTION

Diesel engine systems are utilizing Selective Catalytic Reduction systems (SCR) downstream of a Continuous Regeneration Trap (CRT) (also referred to as a Filter Trap), to limit or control emission of nitrogen oxides (NOx) into the atmosphere. Such Diesel engine systems have also been designed which include a CRT canister housing a Diesel Particulate Filter (DPF) and a Diesel Oxidation Catalyst (DOC) upstream of the DFP. Near the connection ends of the CRT, the upstream and downstream exhaust pipes are provided with inlet and outlet temperature sensors. The temperature sensors are used to determine when to inject diesel fuel to burn-off accumulated diesel soot on the DPF, commonly called dosing. A third temperature sensor controls the doser to prevent overheating and ultimate failure of the CRT.

An SCR downstream of the CRT may be used to further reduce NOx emissions. This SCR is similar in design to the DPF having a canister and temperature sensors located near the connection ends of the canister. Housed within the canister is an Ammonia Oxidation Catalyst (AOC). A gaseous reductant, typically aqueous ammonia or urea, is added to the exhaust gas stream and is absorbed onto a catalyst. Carbon dioxide (CO2) is a reaction product when urea is used as the reductant.

CRT's and SCR's are manufactured from various ceramic materials used as a carrier, such as titanium oxide, and active catalytic components are usually either oxides of base metals (such as vanadium, molybdenum and tungsten), zeolites or various precious metals. Both are expensive to replace and sometimes stolen for profit. This can be of great cost approaching $4000.00 per vehicle including downtime for the vehicle owner. Some owners attempt to increase engine horsepower by replacing the flow-restricting catalytic devices with a straight or so-called "test pipe", similar to what was done to some automobiles in previous decades. Such devices can be used in place of either catalyst in combination with a new engine code to "trick" the engine. This can result in voiding an engine warranty when detected. Additionally, the EPA can impose substantial fines regarding this practice.

Engines frequently undergo transient or changing operating conditions, such as a speed or torque transient. A system or method which detects a missing catalytic device during such a transient operating condition is desired.

SUMMARY

According to an aspect of the present disclosure, an engine has an exhaust gas system which flows exhaust gasses through an aftertreatment device. Preferably, the aftertreatment device includes an SCR catalyst, and an ammonia oxidation catalyst. An inlet temperature sensor senses exhaust gas temperature at an inlet of the aftertreatment device. An outlet temperature sensor senses exhaust gas temperature at an outlet of the aftertreatment device. An electronic control unit (ECU) processes the signals from the temperature sensors.

A method is provided for detecting the presence and/or absence of the aftertreatment device during a transient operating condition. The method includes the following steps. Incrementing a stabilization timer until the stabilization timer has reached a certain time period, then sensing an inlet temperature of the exhaust gas at an inlet of exhaust aftertreatment system, and sensing an outlet temperature of the exhaust gas temperature at an outlet of exhaust aftertreatment system. The inlet temperature is filtered.

The ECU calculates an inlet temperature difference between the filtered and unfiltered inlet temperatures, and compares an absolute value of the inlet temperature difference to a first threshold. If the absolute value of the inlet temperature difference is greater than the predetermined threshold, then the ECU calculates an outlet temperature difference between a modeled and the sensed outlet temperature. The ECU then compares an absolute value of the outlet temperature difference to a second threshold, and if the absolute value of the outlet temperature difference is greater than the second threshold, the ECU generates a fault signal indicating that the aftertreatment device is missing.

DETAILED DESCRIPTION OF THE DRAWINGS

Figure 1:
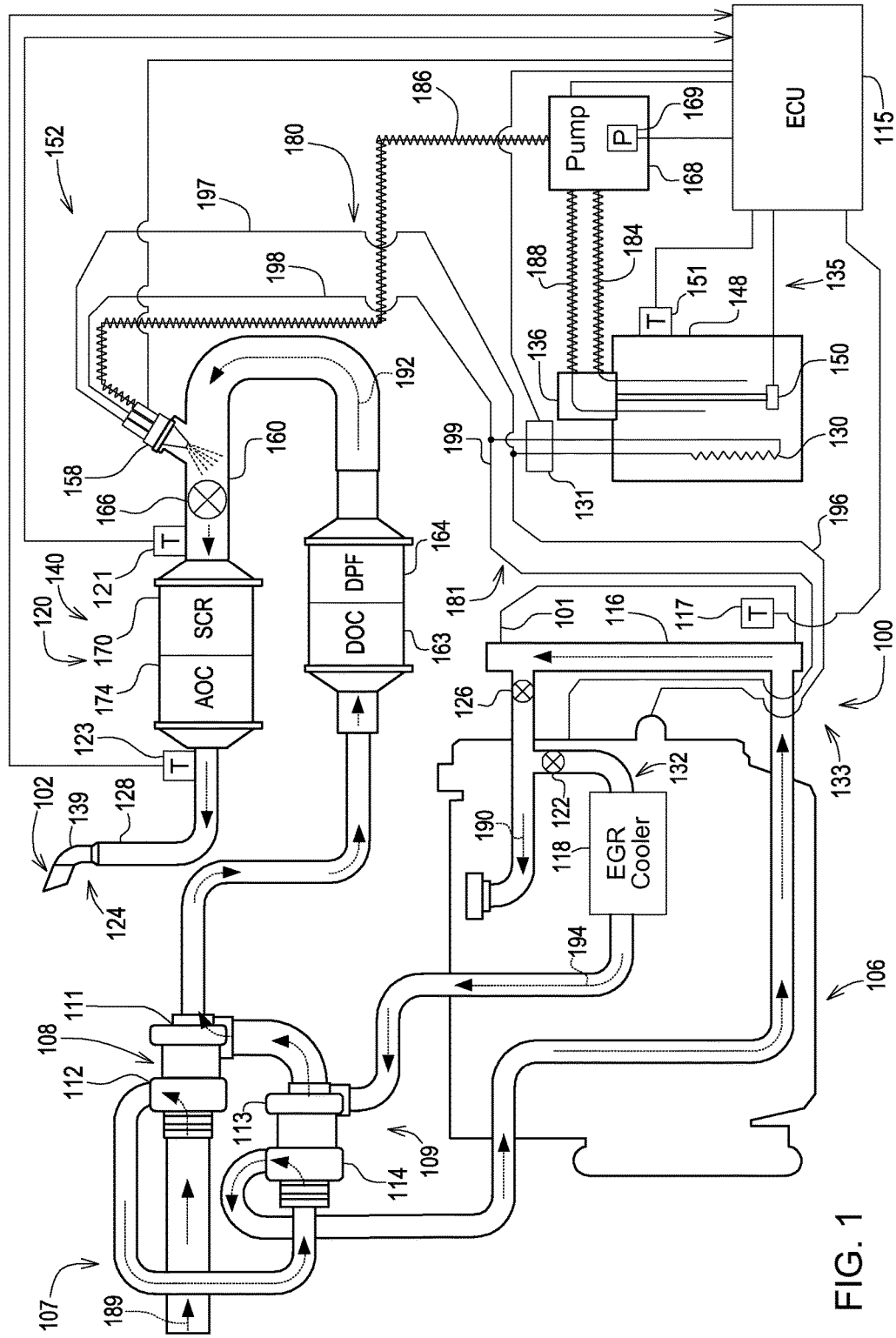
FIG. 1 is a schematic diagram of a power system including an exhaust system embodying the invention.

Referring to FIG. 1, a power system 100 includes an engine 106. The power system 100 may be used for providing power to a variety of machines, including on-highway trucks, construction vehicles, marine vessels, stationary generators, automobiles, agricultural vehicles, and recreation vehicles.

The engine 106 may be any kind of engine 106 that produces an exhaust gas, the exhaust gas being indicated by directional arrow 192. For example, engine 106 may be an internal combustion engine, such as a gasoline engine, a diesel engine, a gaseous fuel burning engine (e.g., natural gas) or any other exhaust gas producing engine. The engine 106 may be of any size, with any number cylinders (not shown), and in any configuration (e.g., "V," inline, and radial). Although not shown, the engine 106 may include various sensors, such as temperature sensors, pressure sensors, and mass flow sensors.

The power system 100 may include an intake system 107. The intake system 107 may include components configured to introduce a fresh intake gas, indicated by directional arrow 189, into the engine 106. For example, the intake system 107 may include an intake manifold (not shown) in communication with the cylinders, a compressor 112, a charge air cooler 116, and an air throttle actuator 126. The power system 100 also includes a conventional radiator 101 for cooling engine coolant and a coolant temperature sensor 117.

The compressor 112 may be a fixed geometry compressor, a variable geometry compressor, or any other type of compressor configured to receive the fresh intake gas, from upstream of the compressor 112. The compressor 112 compress the fresh intake gas to an elevated pressure level. As shown, the charge air cooler 116 is positioned downstream of the compressor 112, and it is configured to cool the fresh intake gas. The air throttle actuator 126 may be positioned downstream of the charge air cooler 116, and it may be, for example, a flap type valve controlled by an electronic control unit (ECU) 115 to regulate the air-fuel ratio.

Further, the power system 100 may include an exhaust system 140. The exhaust system 140 may include components configured to direct exhaust gas from the engine 106 to the atmosphere. Specifically, the exhaust system 140 may include an exhaust manifold (not shown) in fluid communication with the cylinders. During an exhaust stroke, at least one exhaust valve (not shown) opens, allowing the exhaust gas to flow through the exhaust manifold and a turbine 111. The pressure and volume of the exhaust gas drives the turbine 111, allowing it to drive the compressor 112 via a shaft (not shown). The combination of the compressor 112, the shaft, and the turbine 111 is known as a turbocharger 108.

The power system 100 may also include, for example, a second turbocharger 109 that cooperates with the turbocharger 108 (i.e., series turbocharging). The second turbocharger 109 includes a second compressor 114, a second shaft (not shown), and a second turbine 113. Exemplarily, the second compressor 114 may be a fixed geometry compressor, a variable geometry compressor, or any other type of compressor configured to receive the fresh intake flow, from upstream of the second compressor 114, and compress the fresh intake flow to an elevated pressure level before it enters the engine 106.

The power system 100 may also includes an exhaust gas recirculation (EGR) system 132 that is configured to receive a recirculated portion of the exhaust gas, as indicated by directional arrow 194. The intake gas is indicated by directional arrow 190, and it is a combination of the fresh intake gas and the recirculated portion of the exhaust gas. The EGR system 132 includes an EGR valve 122, an EGR cooler 118, and an EGR mixer (not shown).

The EGR valve 122 may be a vacuum controlled valve, allowing a specific amount of the recirculated portion of the exhaust gas back into the intake manifold. The EGR cooler 118 is configured to cool the recirculated portion of the exhaust gas flowing therethrough. Although the EGR valve 122 is illustrated as being downstream of the EGR cooler 118, it could also be positioned upstream from the EGR cooler 118. The EGR mixer is configured to mix the recirculated portion of the exhaust gas and the fresh intake gas into, as noted above, the intake gas.

As further shown, the exhaust system 140 may include an aftertreatment system 120, and at least a portion of the exhaust gas passes therethrough. The aftertreatment system 120 is configured to remove various chemical compounds and particulate emissions present in the exhaust gas received from the engine 106. After being treated by the exhaust aftertreatment system 120, the exhaust gas is expelled into the atmosphere via a tailpipe 178.

In the illustrated embodiment, the exhaust aftertreatment system 120 includes a diesel oxidation catalyst (DOC) 163, a diesel particulate filter (DPF) 164, and a selective catalytic reduction (SCR) system 152. The SCR system 152 includes a first reductant or DEF delivery system 135, an SCR catalyst 170, and an ammonia oxidation catalyst (AOC) 174. Exemplarily, the exhaust gas flows through the DOC 163, the DPF 164, the SCR catalyst 170, and the AOC 174, and is then, as just mentioned, expelled into the atmosphere via the tailpipe 178. An inlet temperature sensor 121 senses the exhaust gas temperature at an inlet of exhaust aftertreatment system 120. An outlet temperature sensor 123 senses the exhaust gas temperature at an outlet of exhaust aftertreatment system 120.

In other words, in the embodiment shown, the DPF 164 is positioned downstream of the DOC 163, the SCR catalyst 170 downstream of the DPF 164, and the AOC 174 downstream of the SCR catalyst 170. The DOC 163, the DPF 164, the SCR catalyst 170, and the AOC 174 may be coupled together. Exhaust gas treated, in the aftertreatment system 120, and released into the atmosphere contains significantly fewer pollutants—such as diesel particulate matter, NO2, and hydrocarbons—than an untreated exhaust gas.

The DOC 163 may be configured in a variety of ways and contain catalyst materials useful in collecting, absorbing, adsorbing, and/or converting hydrocarbons, carbon monoxide, and/or oxides of nitrogen contained in the exhaust gas. Such catalyst materials may include, for example, aluminum, platinum, palladium, rhodium, barium, cerium, and/or alkali metals, alkaline-earth metals, rare-earth metals, or combinations thereof. The DOC 163 may include, for example, a ceramic substrate, a metallic mesh, foam, or any other porous material known in the art, and the catalyst materials may be located on, for example, a substrate of the DOC 163. The DOC(s) may also be configured to oxidize NO contained in the exhaust gas, thereby converting it to NO2. Or, stated slightly differently, the DOC 163 may assist in achieving a desired ratio of NO to NO2 upstream of the SCR catalyst 170.

The DPF 164 may be any of various particulate filters known in the art configured to reduce particulate matter concentrations, e.g., soot and ash, in the exhaust gas to meet requisite emission standards. Any structure capable of removing particulate matter from the exhaust gas of the engine 106 may be used. For example, the DPF 164 may include a wall-flow ceramic substrate having a honeycomb cross-section constructed of cordierite, silicon carbide, or other suitable material to remove the particulate matter. The DPF 164 may be electrically coupled to a controller, such as the ECU 115, that controls various characteristics of the DPF 164.

If the DPF 164 were used alone, it would initially help in meeting the emission requirements, but would quickly fill up with soot and need to be replaced. Therefore, the DPF 164 is combined with the DOC 163, which helps extend the life of the DPF 164 through the process of regeneration. The ECU 115 may be configured to measure the PM build up, also known as filter loading, in the DPF 164, using a combination of algorithms and sensors. When filter loading occurs, the ECU 115 manages the initiation and duration of the regeneration process.

Moreover, the delivery system 135 may include a reductant tank 148 configured to store the reductant. One example of a reductant is a solution having 32.5% high purity urea and 67.5% de-ionized water (e.g., DEF), which decomposes as it travels through a decomposition tube 160 to produce ammonia. Such a reductant may begin to freeze at approximately 12 deg F. (−11 deg C.). If the reductant freezes when a machine is shut down, then the reductant may need to be thawed before the SCR system 152 can function.

The reductant delivery system 135 may include a reductant header 136 mounted to the reductant tank 148, the reductant header 136 further comprising, in some embodiments, a level sensor 150 configured to measure a quantity of the reductant in the reductant tank 148. The level sensor 150 may include a float configured to float at a liquid/air surface interface of reductant included within the reductant tank 148. Other implementations of the level sensor 150 are possible, and may include, exemplarily, one or more of the following: (a) using one or more ultrasonic sensors; (b) using one or more optical liquid-surface measurement sensors; (c) using one or more pressure sensors disposed within the reductant tank 148; and (d) using one or more capacitance sensors. A temperature sensor 151 senses the temperature of the reductant.

The reductant header 136 includes a tank heating element 130 that is configured to receive coolant from the engine 106, and the power system 100 may include a cooling system 133 that includes a coolant supply passage 180 and a coolant return passage 181. Optionally, the sensor 151 may be part of the header 136. A first segment 196 of the coolant supply passage 180 is positioned fluidly between the engine 106 and the tank heating element 130 and is configured to supply coolant to the tank heating element 130. The coolant circulates, through the tank heating element 130, so as to warm the reductant in the reductant tank 148, therefore reducing the risk that the reductant freezes therein. In an alternative embodiment, the tank heating element 130 may, instead, be an electrically resistive heating element. A coolant heater control valve 131 controls communication of coolant between passages 196, 199 and the heater 130.

A second segment 197 of the coolant supply passage 180 is positioned fluidly between the tank heating element 130 and a reductant delivery mechanism 158 and is configured to supply coolant thereto. The coolant heats the reductant delivery mechanism 158, reducing the risk that reductant freezes therein.

A first segment 198 of the coolant return passage 181 is positioned between the reductant delivery mechanism 158 and the tank heating element 130, and a second segment 199 of the coolant return passage 181 is positioned between the engine 106 and the tank heating element 130. The first segment 198 and the second segment 199 are configured to return the coolant to the engine 106.

The decomposition tube 160 may be positioned downstream of the reductant delivery mechanism or injector 158 but upstream of the SCR catalyst 170. The reductant delivery mechanism 158 may be, for example, an injector that is selectively controllable to inject reductant directly into the exhaust gas. As shown, the SCR system 152 may include a reductant mixer 166 that is positioned upstream of the SCR catalyst 170 and downstream of the reductant delivery mechanism 158.

The reductant delivery system 135 may additionally include a reductant pressure source (not shown) and a reductant extraction passage 184. The reductant extraction passage 184 may be coupled fluidly to the reductant tank 148 and the reductant pressure source therebetween. Exemplarily, the reductant extraction passage 184 is shown extending into the reductant tank 148, though in other embodiments the reductant extraction passage 184 may be coupled to an extraction tube via the reductant header 136. The reductant delivery system 135 may further include a reductant supply module or pump 168, and it may include the reductant pressure source. Exemplarily, the reductant pump 168 may be, or be similar to, a Bosch reductant supply module, such as the one found in the "Bosch Denoxtronic 2.2—Urea Dosing System for SCR Systems." Such a pump includes a built-in pressure sensor 169.

The reductant delivery system 135 may also include a reductant dosing passage 186 and a reductant return passage 188. The reductant return passage 188 is shown extending into the reductant tank 148, though in some embodiments of the power system 100, the reductant return passage 188 may be coupled to a return tube via the reductant header 136.

The reductant delivery system 135 may include, among other things, valves, orifices, sensors, and pumps positioned in the reductant extraction passage 184, reductant dosing passage 186, and reductant return passage 188.

As mentioned above, one example of a reductant is a solution having 32.5% high purity urea and 67.5% deionized water (e.g., DEF), which decomposes as it travels through the decomposition tube 160 to produce ammonia. The ammonia reacts with NO in the presence of the SCR catalyst 170, and it reduces the NO to less harmful emissions, such as N2 and H2O. The SCR catalyst 170 may be any of various catalysts known in the art. For example, in some embodiments, the SCR catalyst 170 may be a vanadium-based catalyst. But in other embodiments, the SCR catalyst 170 may be a zeolite-based catalyst, such as a Cu-zeolite or a Fe-zeolite.

The AOC 174 may be any of various flow-through catalysts configured to react with ammonia to produce mainly nitrogen. Generally, the AOC 174 is utilized to remove ammonia that has slipped through or exited the SCR catalyst 170. As shown, the AOC 174 and the SCR catalyst 170 may be positioned within the same housing. But in other embodiments, they may be separate from one another.

The power system 100 also includes an intake system 107. The intake system 107 may include components configured to introduce a fresh intake gas, indicated by directional arrow 189, into the engine 106. For example, the intake system 107 may include an intake manifold (not shown) in communication with the cylinders, a compressor 112, a charge air cooler 116, and an air throttle actuator 126.

The ECU 115 also receives information from the reductant level sensor 150, the reductant temperature sensor 151 and from the coolant temperature sensor 117. As a function of these inputs, the ECU 115 controls the heater control valve 131 and the pump 168. Optionally, the functions of ECU 115 and 161 may be combined into a single ECU, if desired.

Figure 2:
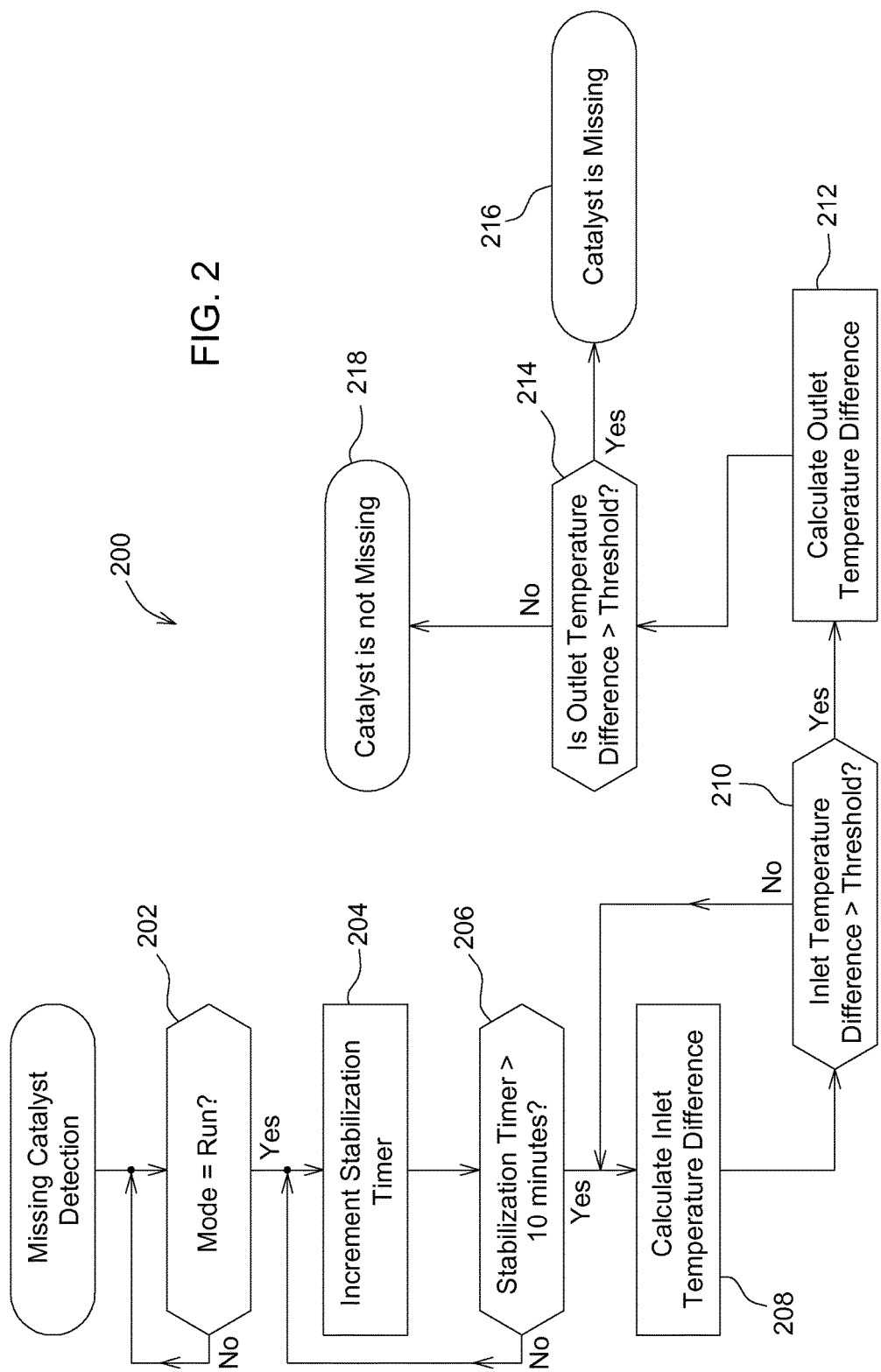
FIG. 2 is a flow chart of an algorithm performed by the electronic control unit of FIG. 1.

Referring now to FIG. 2, the ECU 115 executes the algorithm 200 shown therein. The algorithm 200 starts at step 202, which directs the algorithm to step 204 if the engine 106 is running, else step 202 repeats.

Step 204 increments a stabilization timer.

Then, step 206 directs the algorithm to step 208 if the stabilization timer has reached 10 minutes, else step 206 directs the algorithm back to step 204.

Steps 208 and 210 evaluate a temperature transient as follows. Inlet temperature from sensor 121 is software filtered (continuously, such as with a filter time constant of 5 second). The temperature sensors 121 and 123 may have a plus/minus design tolerance in a range of 8 to 20 degrees Celsius. The larger the tolerance, the more difficult it is to detect a missing catalyst. To overcome this situation, the temperature signals are filtered.

A difference between filtered and unfiltered temperature signals is calculated. If the absolute value of the difference is greater than a threshold (e.g. 15 degree C.), then a temperature transient event is detected and step 210 directs the algorithm to step 212, else back to step 208.

Step 212 calculates a difference between a modeled and a sensed outlet temperature sensed by sensor 123. An estimate of the catalyst outlet temperature is obtained from a thermal model (preferably a physics based model) as a function of measured catalyst inlet temperature from sensor 121, measured or estimated exhaust flow rate, estimated heat loss to ambient, etc. The difference between estimated and measured catalyst outlet temperature from sensor 123 is calculated. Optionally, the above calculated difference could be software filtered, such as by a filter time constant of 10 seconds.

Then, in step 214, the absolute value of the difference from step 212 is compared to a threshold, such as 30 degree C. The threshold could be a function of exhaust flow rate and gas temperature for better accuracy. If the absolute value of the difference from step 212 is greater than the threshold, then a missing catalyst event is detected and the algorithm is directed to step 216.

The conversion of the above flow chart into a standard language for implementing the algorithm described by the flow chart in a digital computer or microprocessor, will be evident to one with ordinary skill in the art.

With this system, the error sources associated with inlet and outlet temperature sensor measurement inaccuracies are reduced, thus making the catalyst missing detection method more robust.

The result is a system which detects a missing or partial of catalytic device having at least a certain cross-sectional and depth magnitude. The system uses the inlet and outlet temperature sensors to compare measurements during transient temperature operation. A catalyst acts like a heat exchanger, because of its large internal surface area. Thus, its outlet temperature will lag its inlet temperature during a temperature transient. The lag (and therefore temperature drop between inlet and outlet during a transient operation) will be a function of the exhaust gas velocity, and catalyst design and properties. This temperature difference during transients is expected and measurable for an in-place functioning catalyst, and can be compared to the temperature difference that is sensed which a catalytic device is removed or tampered with.

If a catalytic device has been tampered with, the entering hot exhaust gas stream will pass quickly through without losing much heat to the catalyst. Therefore, the outlet exhaust temperature will remain near that of the entering exhaust temperature, even during temperature transients. If that happens, then an engine code is revised to send a signal or warning to the operator that a fault has been detected in the after treatment system. This signal may also be used to de-rate the engine performance to near zero, in order to require a corrective action be taken.

The gas temperature exiting the catalyst can be modeled quite accurately. The ECU compares modeled and measured outlet gas temperatures during temperature transients of inlet temperature. If the catalyst is missing, then there would be large difference between the modeled and measured outlet temperature during transients. If the catalyst is not missing, then there would not be a large difference between the modeled and measured outlet temperature during transients. By monitoring the temperature difference between modeled and measured outlet gas temperatures during a temperature transient of the inlet temperature sensor, ECU can detect the missing catalyst tampering condition.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. In an engine having an exhaust gas system which flows exhaust gasses through an aftertreatment device, a method for detecting the aftertreatment device, the method comprising the following steps:
    (a) sensing an inlet temperature of the exhaust gas at an inlet of the aftertreatment device;
    (b) sensing an outlet temperature of the exhaust gas at an outlet of the aftertreatment device;
    (c) filtering the inlet temperature;
    (d) calculating an inlet temperature difference between the filtered and unfiltered inlet temperatures;
    (e) comparing the inlet temperature difference to a first threshold;
    (f) detecting that the inlet temperature difference is greater than a predetermined threshold, and in response to the detection of an occurrence of the inlet temperature difference being greater than the predetermined threshold, calculating an outlet temperature difference between a modeled outlet temperature and the sensed outlet temperature, the modeled outlet temperature representing a simulated temperature of the exhaust gas at the outlet of the aftertreatment device;
    (g) comparing an absolute value of the outlet temperature difference to a second threshold; and
    (h) detecting that the absolute value of the outlet temperature difference is greater than the second threshold, in response to the detection of the outlet temperature difference being greater than the second threshold, sending a signal to an operator of the engine indicating that the aftertreatment device is missing.

2. The method of claim 1, wherein:
the aftertreatment device comprises an SCR catalyst.

3. The method of claim 1, wherein:
the aftertreatment device comprises an SCR catalyst, and an ammonia oxidation catalyst.

4. The method of claim 1, wherein:
an absolute value of the inlet temperature difference is compared to the first threshold; and
detecting that the absolute value of the inlet temperature difference is greater than the predetermined threshold, and in response to the detection of an occurrence of the absolute value of the inlet temperature difference being greater than the predetermined threshold, calculating an outlet temperature difference between a modeled and the sensed outlet temperature.

5. The method of claim 1, wherein:
detecting that the inlet temperature difference is not greater than the predetermined threshold, and in response to the detection of an occurrence of the inlet temperature difference being not greater than the predetermined threshold, repeating steps (d) and (e).

6. The method of claim 1, wherein:
before step (a), incrementing a stabilization timer; and
performing step (a) after the stabilization timer has reached a certain time period, else incrementing a stabilization timer.

7. In an engine having an exhaust gas system which flows exhaust gasses through an aftertreatment device, a method for detecting the aftertreatment device, the method comprising:
    incrementing a stabilization timer until the stabilization timer has reached a certain time period, then;
    sensing an inlet temperature of the exhaust gas at an inlet of the aftertreatment device;
    sensing an outlet temperature of the exhaust gas at an outlet of the aftertreatment device;
    filtering the inlet temperature;

calculating an inlet temperature difference between the filtered and unfiltered inlet temperatures;

comparing an absolute value of the inlet temperature difference to a first threshold;

detecting that the absolute value of the inlet temperature difference is greater than a predetermined threshold, and in response to the detection of an occurrence of the absolute value of the inlet temperature difference being greater than the predetermined threshold, calculating an outlet temperature difference between a modeled outlet temperature and the sensed outlet temperature, the modeled outlet temperature representing a simulated temperature of the exhaust gas at the outlet of the aftertreatment device;

comparing an absolute value of the outlet temperature difference to a second threshold; and detecting that the absolute value of the outlet temperature difference is greater than the second threshold, and in response to the detection of an occurrence of the absolute value of the outlet temperature difference being greater than the second threshold, generating a fault signal indicating that the aftertreatment device is missing.

8. The method of claim 7, wherein:
the aftertreatment device comprises an SCR catalyst, and an ammonia oxidation catalyst.

9. In an engine having an exhaust gas system which flows exhaust gasses through an aftertreatment device, a method for detecting the aftertreatment device, the method comprising:

sensing an inlet temperature of the exhaust gas at an inlet of aftertreatment device;

sensing an outlet temperature of the exhaust gas at an outlet of aftertreatment device;

filtering the inlet temperature;

calculating an inlet temperature difference between the filtered and unfiltered inlet temperatures;

comparing an absolute value of the inlet temperature difference to a first threshold;

detecting that the absolute value of the inlet temperature difference is greater than a predetermined threshold, and in response to the detection of an occurrence of the absolute value of the inlet temperature difference being greater than the predetermined threshold, calculating an outlet temperature difference between a modeled outlet temperature and the sensed outlet temperature, the modeled outlet temperature representing a simulated temperature of the exhaust gas at the outlet of the aftertreatment device;

comparing an absolute value of the outlet temperature difference to a second threshold; and detecting that the absolute value of the outlet temperature difference is greater than the second threshold, and in response to the detection of an occurrence of the absolute value of the outlet temperature difference being greater than a second threshold, sending a warning to an operator of the engine indicating that the aftertreatment device is missing.

10. The method of claim 9, wherein:
the aftertreatment device comprises an SCR catalyst.

11. The method of claim 9, wherein:
the aftertreatment device comprises an SCR catalyst, and an ammonia oxidation catalyst.

12. In an engine having an exhaust gas system which flows exhaust gasses through an aftertreatment device, a method for detecting the aftertreatment device, the method comprising the following steps:

(a) sensing an inlet temperature of the exhaust gas at an inlet of the aftertreatment device;

(b) sensing an outlet temperature of the exhaust gas at an outlet of aftertreatment device;

(c) detecting a transient operating condition by analyzing the sensed temperatures;

(d) calculating an outlet temperature difference between a modeled outlet temperature and the sensed outlet temperature, the modeled outlet temperature representing a simulated temperature of the exhaust gas at the outlet of the aftertreatment device;

(e) comparing an absolute value of the outlet temperature difference to a threshold; and (f) detecting that the absolute value of the outlet temperature difference is greater than the threshold, and in response to the detection of an occurrence of the absolute value of the outlet temperature difference being greater than the threshold, de-rating the engine.

* * * * *